(12) United States Patent
Nasserrafi et al.

(10) Patent No.: US 10,307,856 B2
(45) Date of Patent: Jun. 4, 2019

(54) METHOD FOR JOULE HEATING DIFFUSION BONDED HONEYCOMB CORE

(71) Applicant: SPIRIT AEROSYSTEMS, INC., Wichita, KS (US)

(72) Inventors: Rahbar Nasserrafi, Andover, KS (US); Dennis R. Lebeda, Rose Hill, KS (US); Michael Basala, Wichita, KS (US)

(73) Assignee: Spirit AeroSystems, Inc., Wichita, KS (US)

( * ) Notice: Subject to any disclaimer, the term of this patent is extended or adjusted under 35 U.S.C. 154(b) by 724 days.

(21) Appl. No.: 14/938,549

(22) Filed: Nov. 11, 2015

(65) Prior Publication Data
US 2017/0129041 A1    May 11, 2017

(51) Int. Cl.
*B23K 11/00* (2006.01)

(52) U.S. Cl.
CPC ................. *B23K 11/0093* (2013.01)

(58) Field of Classification Search
CPC ............ B23K 11/0093; B23K 11/0086; B23K 11/008; B23K 1/004; B23K 11/004; B23K 1/0014; B23K 11/00; B23K 11/002; B23K 11/0033
USPC .................. 219/78.02, 78.12, 78.11
See application file for complete search history.

(56) References Cited

U.S. PATENT DOCUMENTS

| | | | | |
|---|---|---|---|---|
| 2,975,263 | A * | 3/1961 | Green | B23K 11/0093 219/78.12 |
| 3,612,813 | A * | 10/1971 | Gerath | B21D 47/00 219/78.12 |
| 3,823,299 | A * | 7/1974 | Metcalfe | B21B 45/004 219/110 |

* cited by examiner

*Primary Examiner* — Tu B Hoang
*Assistant Examiner* — Diallo I Duniver
(74) *Attorney, Agent, or Firm* — Hovey Williams LLP (57) ABSTRACT

A joule-heating press and method for manufacturing a metallic honeycomb core via diffusion bonding. The method may include printing a pattern of strips of a stop-off material to surfaces of a plurality of sheets of metal at locations where diffusion bonding is not desired and stacking the sheets of metal together in a sequence for forming the honeycomb core. Then the method may include steps of pressing the sheets of metal together between two press plates made of conductive material and applying electric current to the conductive material of the press plates. This allows current to flow through a thickness of the sheets of metal and the sheets of metal are thereby diffusion bonded to each other via joule heating at locations absent the stop-off material. Finally, the method may include a step of expanding the sheets of metal into the honeycomb core.

16 Claims, 8 Drawing Sheets

METHOD FOR JOULE HEATING DIFFUSION BONDED HONEYCOMB CORE

BACKGROUND

Honeycomb cores are used in a variety of aircraft components, such as engine nacelles, to minimize material use and therefore minimize weight and cost. These honeycomb cores may be made of metals or composite materials. Manufacturing methods to form metal honeycomb cores can be costly and time consuming. For example, diffusion bonding of titanium honeycomb cores can take in excess of eight hours inside a vacuum chamber. Furthermore, such vacuum chambers can be quite large and costly. After diffusion bonding is complete, these titanium honeycomb cores typically require additional forming or bending operations to achieve a desired shape and contour. This additional forming adds to the already lengthy manufacturing time and subjects the titanium honeycomb cores to further strain, potentially leading to crushing, disbonding, or buckling of the core.

Thus, there is a need for a method of forming metal honeycomb core that overcomes the disadvantages of the prior art.

SUMMARY OF THE INVENTION

Embodiments of the present invention solve the above-mentioned problems and provide a distinct advance in the art of manufacturing diffusion bonded metallic honeycomb cores.

One embodiment of the invention is a method of manufacturing a honeycomb core, and may include the steps of applying or printing a pattern of strips of a stop-off material to surfaces of a plurality of sheets of metal at locations where diffusion bonding is not desired, then stacking the sheets of metal together in a sequence for forming the honeycomb core. Next, the method may include the steps of pressing the sheets of metal together between two press plates of conductive material and applying electric current to the conductive material of the press plates. This allows current to flow through a thickness of the sheets of metal and the sheets of metal are thus diffusion bonded to each other at locations absent the stop-off material. Finally, the method may include a step of expanding the diffusion-bonded sheets of metal into the honeycomb core.

In some embodiments of the invention, the printing includes varying shapes and/or widths of some or all of the strips of the stop-off material, resulting in selective shaping or contouring of the honeycomb core and/or varied density of honeycomb core cells when the sheets of metal are expanded into the honeycomb core. Furthermore, the pattern of spaced apart strips of the stop-off material may be substantially alternated or inverted for successive ones of the sheets of metal during stacking thereof, such that a resulting stack is arranged to properly expand into the honeycomb core after diffusion bonding is complete. Some embodiments of the invention may also include a step of machining diffusion bonded sheets of metal into a desired configuration before the expanding step.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein.

The drawing figures do not limit the current invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Figure 1:
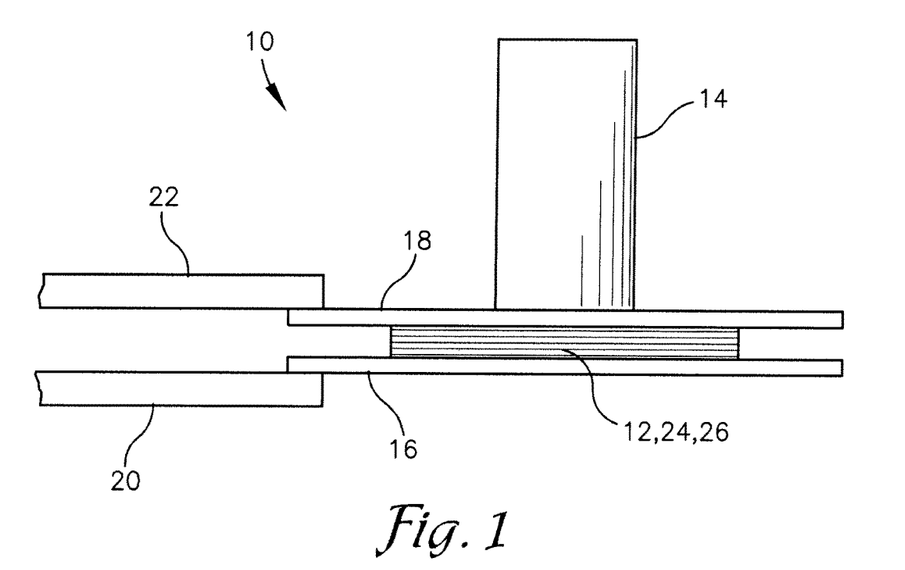
FIG. 1 is a schematic diagram of a joule-heating press constructed according to embodiments of the present invention.
Figure 2:
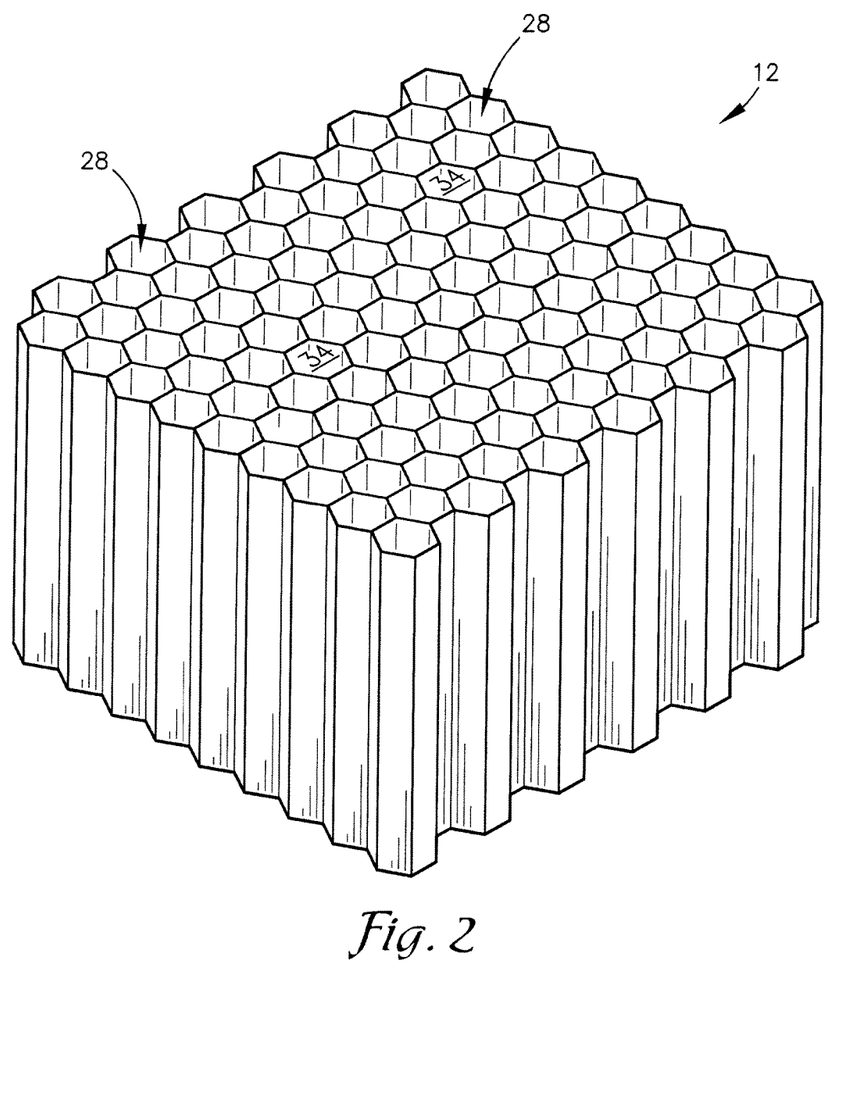
FIG. 2 is a perspective view of a honeycomb core fabricated according to embodiments of the present invention
Figure 3:
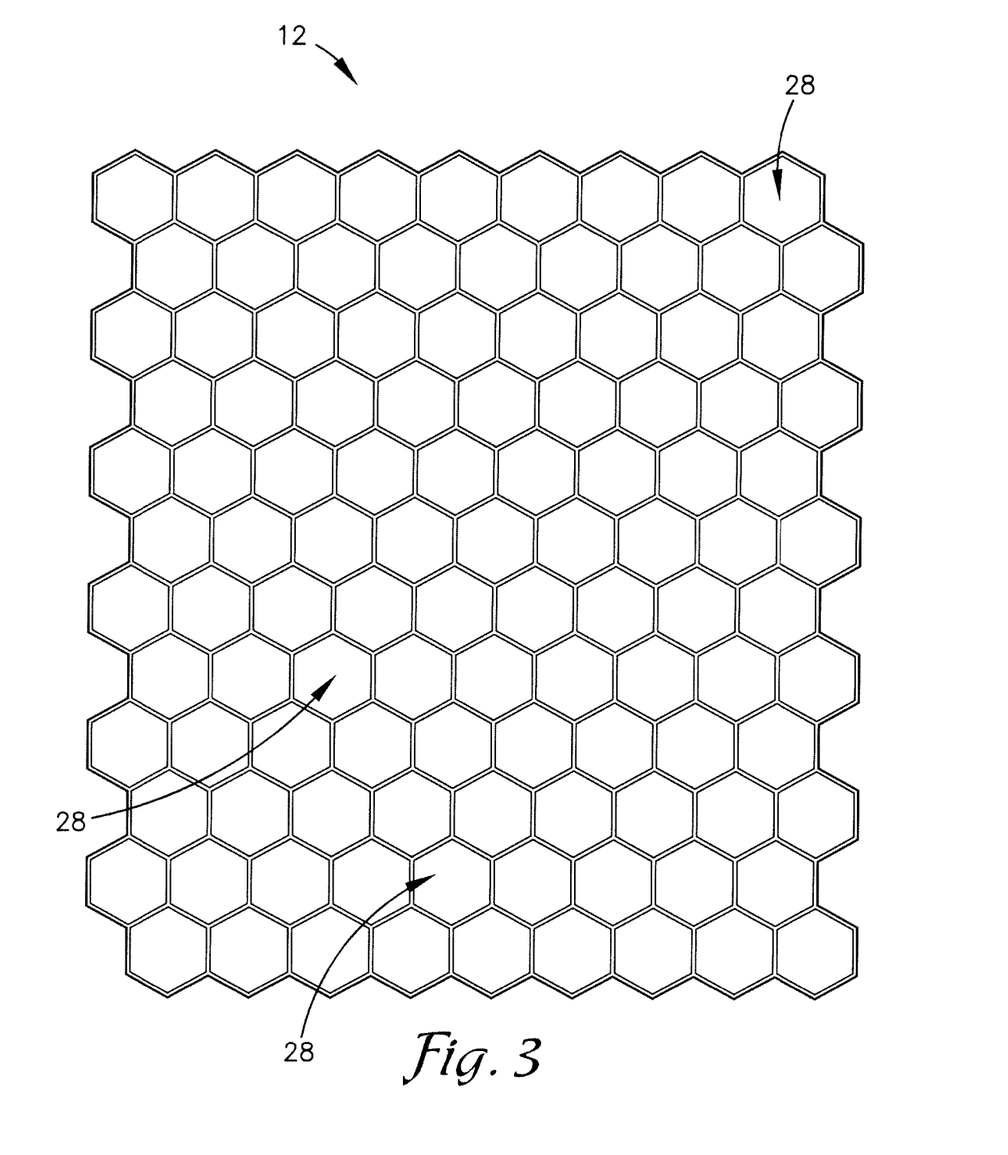
FIG. 3 is a top view of the honeycomb core of FIG. 2.
Figure 6:
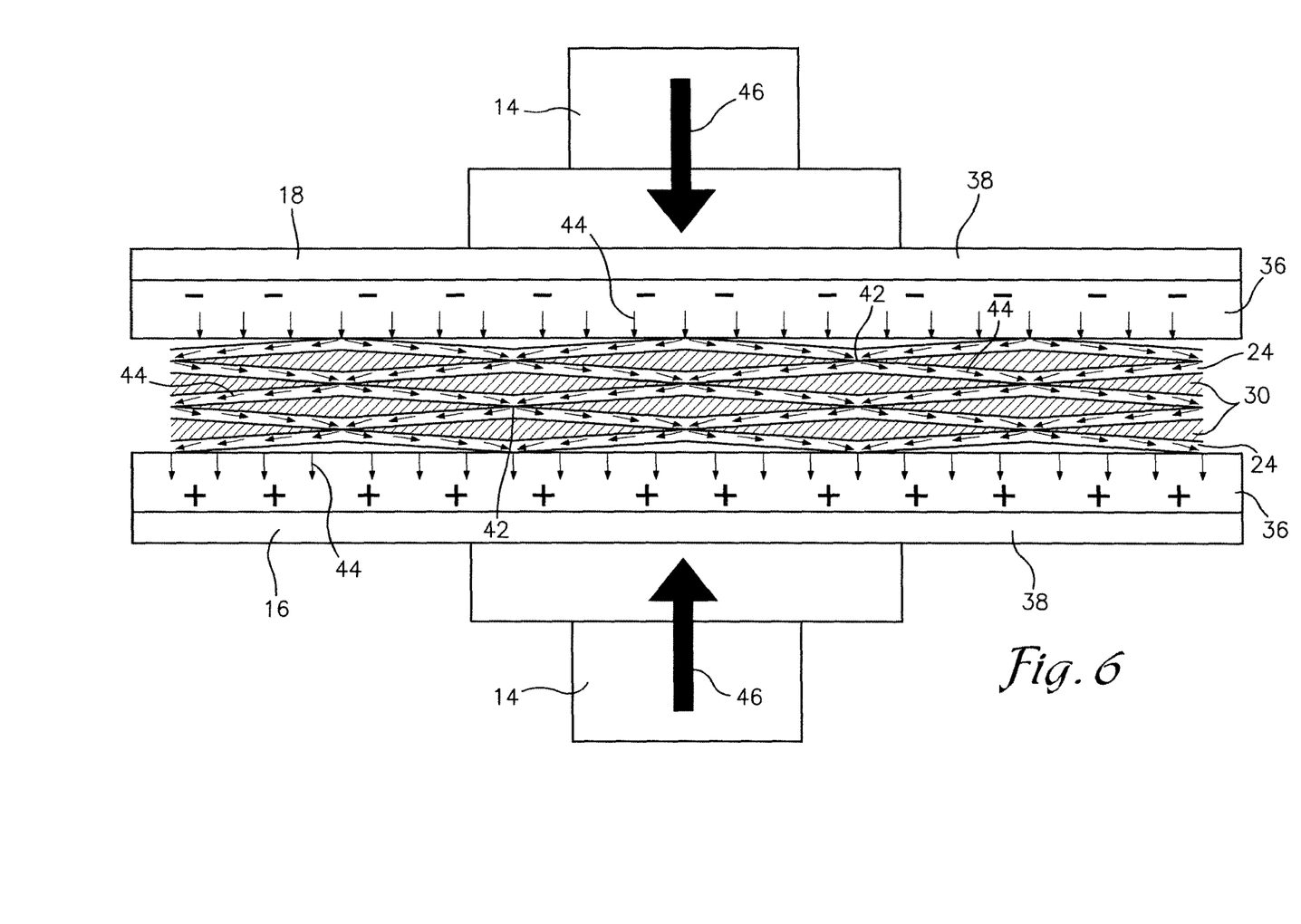
FIG. 6 is a schematic view of the joule-heating press of FIG. 1 with the stack of FIG. 5 placed therein, illustrating a flow of current through the stack.

Embodiments of the invention include a joule-heated press 10 and a method of manufacturing a honeycomb core using joule heating and diffusion bonding. The joule-heated press 10, constructed in accordance with embodiments of the present invention, is illustrated in FIGS. 1 and 6 and is configured to diffusion bond together portions of a honeycomb core 12, as illustrated in FIGS. 2 and 3. The joule-heated press 10 may comprise a force-inducing component 14, two press plates 16,18, and two electrical leads 20,22 electrically coupled to the press plates 16,18.

Figure 4:
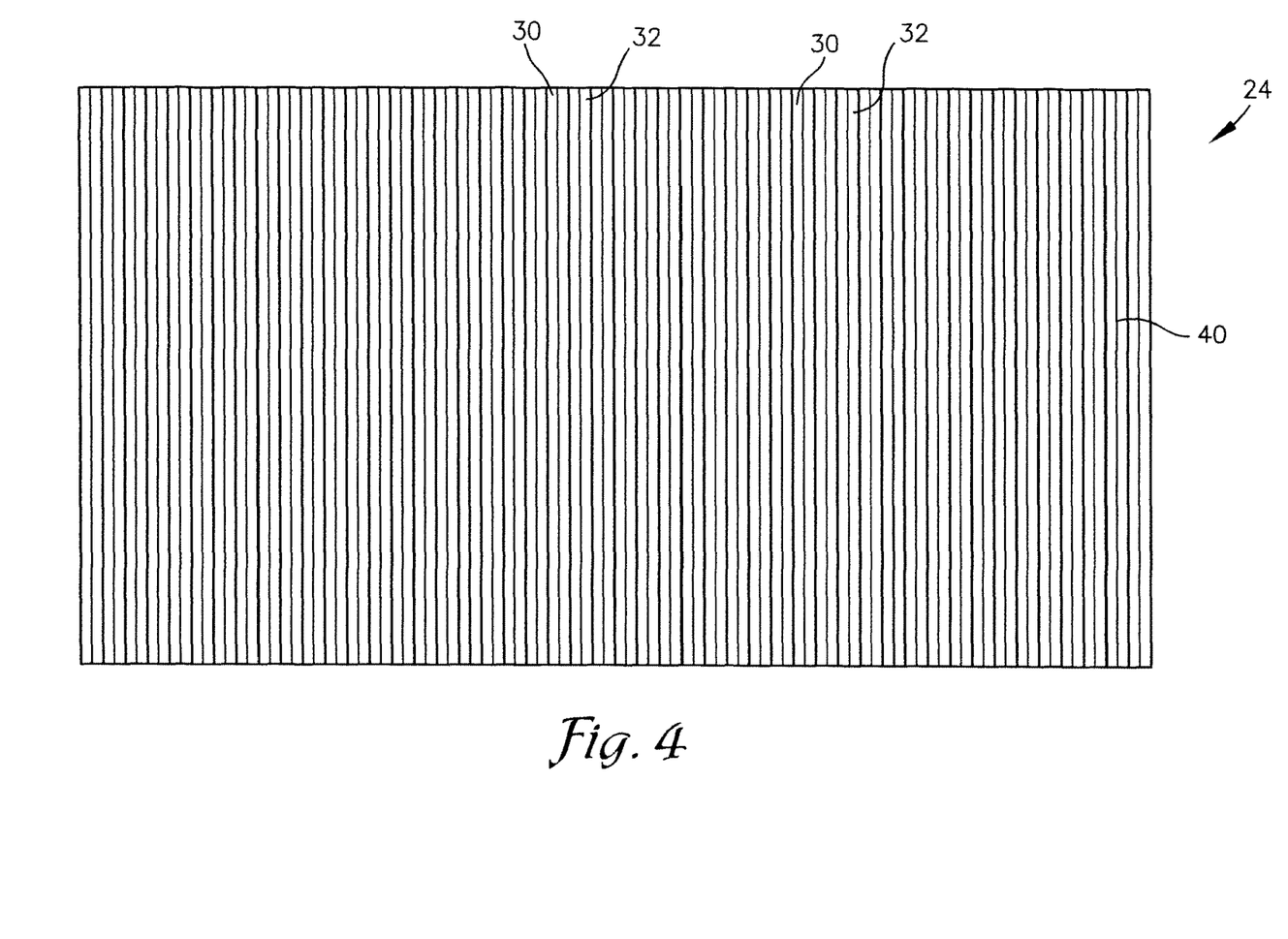
FIG. 4 is a top view of a sheet of material with stop-off material printed thereon.
Figure 5:
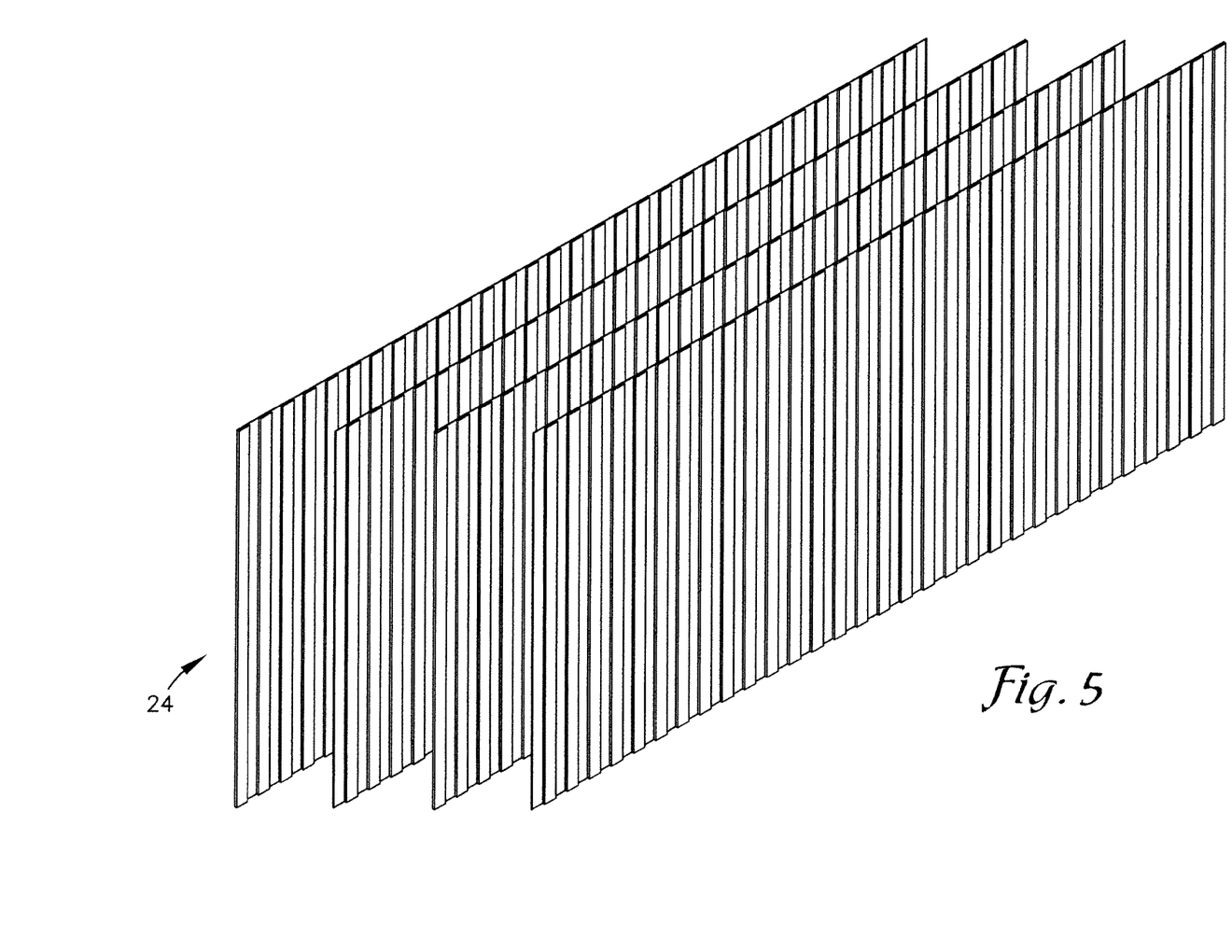
FIG. 5 is an exploded perspective view of multiple sheets of material with stop-off material printed thereon, arranged sequentially with alternating patterns to form a stack.

The honeycomb core 12 may be formed of a plurality of sheets of material 24, as illustrated in FIGS. 4 and 5. These sheets of material 24 may be placed into a stack 26, diffusion bonded at select locations, and expanded to form a plurality of cells 28, as illustrated in FIGS. 2 and 3. The cells 28 may have any shape known in the art, such as hexagonal or other known core cell shapes. The sheets of material 24 may specifically be titanium sheets or sheets of any other metal that can be diffusion bonded with each other. The sheets of material 24 may have stop-off material 30 applied or printed thereon in such a pattern as to prevent diffusion bonding in those locations while allowing diffusion bonding in stop-off-free locations 32. Stop-off-free locations 32 are locations or exposed surfaces on the sheets of material 24 that do not have the stop-off material 30 applied thereto. The surface portions printed with the stop-off material 30 become inner surfaces 34 of the cell 28 of the honeycomb core 12, as later described herein. The stop-off material 30 may be any maskant made of non-conductive, diffusion bonding-resistant material, such as a brazing stop-off compound, ceramic stop-off paint, or the like. In some embodiments of the invention, the stop-off material 30 is roller printed into equally or unequally-spaced strips 40 on one side and/or both opposing sides of each of the sheets of material 24, as illustrated in FIGS. 4 and 5.

The force-inducing component 14 may comprise at least one actuatable component sufficient to press at least one of the press plates 16 in a direction toward the other the press plates 18. For example, the force-inducing component 14 may comprise two force-inducing components, as illustrated in FIG. 6, such as two hydraulic rams each attached to one of the press plates 16,18 and hydraulically actuatable to press the press plates 16,18 towards each other. Thus, the sheets of material 24 placed between the press plates 16,18 may be compressed by the press plates 16,18 via the force from the force-inducing components 14. In other embodiments of the invention, the force-inducing component 14 may include a manually-actuatable block or weighted component for compressing the sheets of material between the press plates 16,18 or between one press plate 18 and another stable, supportive surface.

The press plates 16,18 may include any rigid, conductive material 36, such as copper, and may be planar or have any shape, size and curvature matching a desired shape, size, and curvature of the honeycomb core 12. The press plates 16,18 may be sized, shaped, and configured to mate with each other when driven together by the force-inducing component 14 with nothing else positioned therebetween. As illustrated in FIG. 6, the press plates 16,18 may also include an insulating layer 38 between the force-inducing components 14 and the rigid, conductive material 36, such that electricity flowing through the rigid, conductive material 36 during joule heating does not flow into the force-inducing components 14 or other components of the joule-heated press 10.

The electrical leads 20,22 may include electrical wires, clamps, or the like that are electrically conductive. The electrical leads 30,33 may include or be electrically coupled to an electricity source (not shown) for providing electrical current through the electrical leads 20,22, the press plates 16,18, and the sheets of material 24 described above. The electricity source may be a battery, a generator, an electrical outlet, or any source of electricity known in the art.

A method of forming the honeycomb core 12 using the joule-heated press 10 described above may first include a step of printing spaced-apart strips 40 of the stop-off material 30 onto the sheets of material 24, then stacking the sheets together, alternating the strips' patterns for each successive sheet of material 24. Then the method may include placing the resulting stack 26 formed from the sheets of material 24 between the press plates 16,18 of the joule-heated press 10, pressing the sheets of material 24 together, and sending electrical current through a thickness of the stack 26, via the electrical leads 20,22 and the press plates 16,18, thus diffusion bonding the sheets of material 24 together at the stop-off-free locations 32. Once the diffusion bonding is complete, the stack 26 may be expanded, thus forming the honeycomb core 12.

Figure 9:
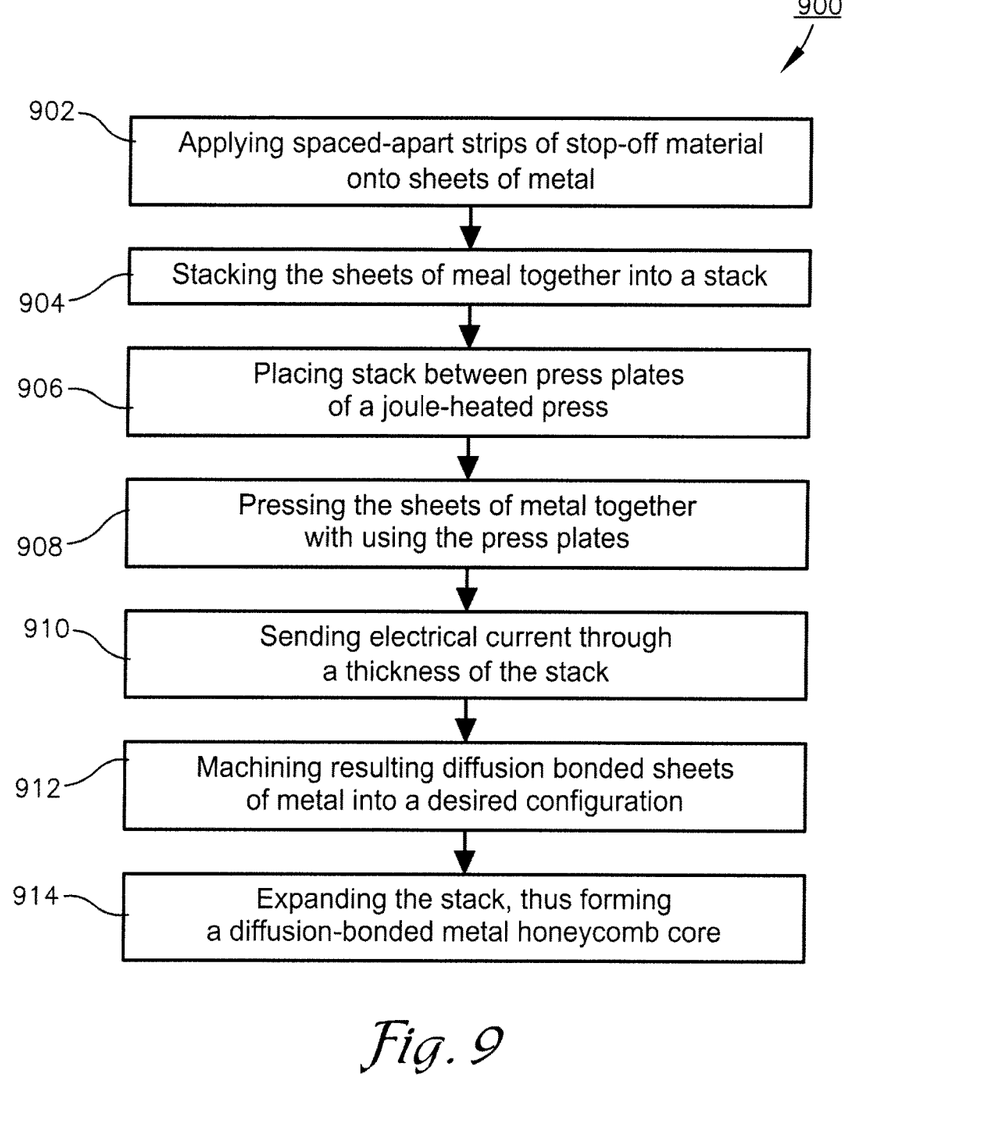
FIG. 9 is a flow chart illustrating a method of manufacturing the honeycomb core of FIG. 1 in accordance with embodiments of the present invention.

Method steps for manufacturing the honeycomb core 12 will now be described in more detail, in accordance with various embodiments of the present invention. The steps of the method 900 may be performed in the order as shown in FIG. 9, or they may be performed in a different order. Furthermore, some steps may be performed concurrently as opposed to sequentially. In addition, some steps may not be performed.

As illustrated in FIG. 9, the method 900 may include a step of applying spaced-apart strips 40 of the stop-off material 30 onto the sheets of material 24, as depicted in block 902, then stacking the sheets of material 24 together, as depicted in block 904, alternating the patterns for each successive sheet of material 24. For example, one sheet of material 24 may have stop-off material 30 at locations in which that sheet's immediately adjacent sheets of material 24 do not, and vice versa. So, in some embodiments of the invention, every sheet of material 24 has a substantially inverse pattern from the one it is stacked onto. This alternating or staggered pattern arrangement allows for the formation of the cells 28 in the resulting honeycomb core 12. Additionally or alternatively, both sides of some or all of the sheets of material 24 may have the stop-off material 30 printed or otherwise applied thereto. For example, the pattern of strips 40 applied to a first side of one of the sheets of material 24 may be an inverse of the pattern of strips 40 applied to an opposing second side thereof. A next adjacent sheet of material 24 in the stack 26 may then have no stop-off material 30 applied thereto, stop-off material 30 on one side only, or stop-off material 30 on both sides without departing from a scope of the invention. The pattern and configuration of the strips 40 may be selected based on the size, shape, type, density, and/or quantity of cells 28 desired in the honeycomb core 12. A two-dimensional length and width of the sheets of material 24 may correspond to the desired length and thickness of the honeycomb core 12. The individual thicknesses of the sheets of material 24 and the quantity of sheets of material 24 stacked together may correspond with a desired width of the expanded honeycomb core 12.

Figure 7:
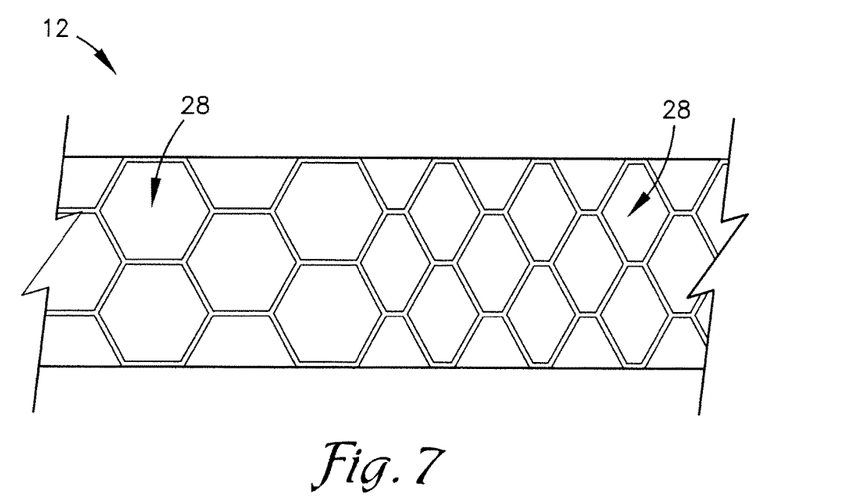
FIG. 7 is a top view of a honeycomb core with variations in cell density, fabricated according to one alternative embodiment of the present invention.
Figure 8:
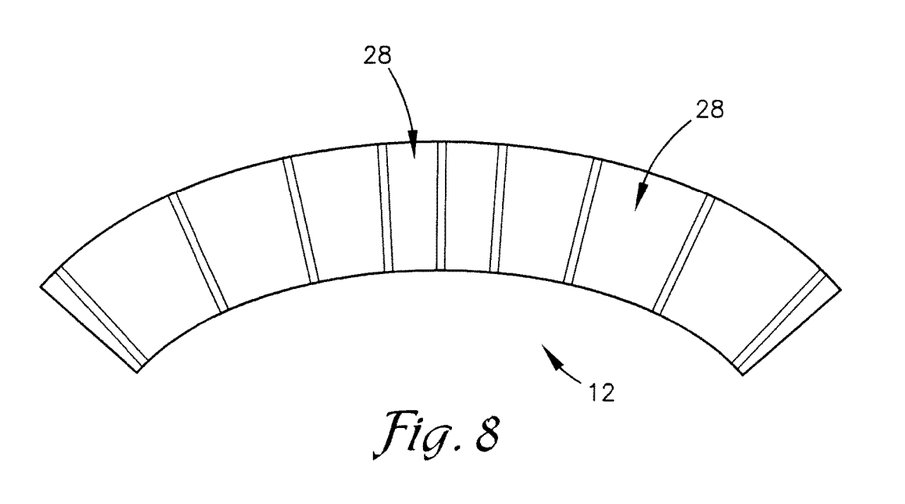
FIG. 8 is a side view of the honeycomb core with variations in cell density and designed in an arc configuration according to another alternative embodiment of the present invention.

In some embodiments of the invention, the step of applying the stop-off material 30 to the sheets of material 24 may also include utilizing computer-aided manufacturing to determine spacing, size, and shape of the stop-off material strips 40. By varying the width, spacing, shape, and/or size the strips 40 in select areas of one or more of the sheets of material 24, an operator may create contoured shapes and bonds that can be optimized in shape and size in order to benefit the load bearing capability of the resulting honeycomb core's structure. This varying of the size and/or shape of the stop-off material strips 40 may also result in selective contouring of the honeycomb core 12 and/or varied density of honeycomb core cells 28 when the sheets of material 24 are expanded into the honeycomb core 12, as illustrated in FIGS. 7 and 8. Specifically, tighter, higher-density cells 28 may be desired for improved structural stability, while lower density cells 28 may be desired for lighter weight of the honeycomb core 12. The ability to create any shape of the honeycomb core 12 by design of the stop-off material 30 may advantageously eliminate the need for any forming or bending operations, thus eliminating crushing, disbonding, and buckling problems often associated with such forming operations for titanium and aluminum honeycomb cores. Furthermore, computer numeric control (CNC) machines or the like may be used to apply the stop-off material 30 described herein, based on the computer-aided modeling performed for determining the shaping and spacing of the stop-off material 30.

Next, the method 900 may include placing the stack 26 formed from the sheets of material 24 between the press plates 16,18 of the joule-heated press 10, as depicted in block 906, pressing the sheets of material 24 together, as depicted in block 908, and sending electrical current through a thickness of the stack 26, as depicted in block 910 and FIG. 6. Specifically, the force-inducing components 14 may press the press plates 16,18 toward each other, pressing the sheets of material 24 in the stack 26 together. In some embodiments of the invention, the force-inducing components 14 may apply, via the two press plates 16,18, compression force of between 5,000 PSI and 10,000 PSI to the stack 26. However, other amounts of pressure or force may be used without departing from the scope of the invention.

Electricity may be provided through the electrical leads 20,22 and the press plates 16,18, thus diffusion bonding, via joule heating, the sheets of material 14 together at the stop-off-free locations 32. Resistance of the sheets of material 24 causes the conductive material in the stack 26 to heat up. Amperage and time required may be determined by the thickness of the stack 26 and/or the sheets of material 24. For example, the amperage required may vary from 250 amperes to over 20,000 amperes, depending on the size and total area of the stop-off-free locations 32 where current can pass through uninterrupted. The amount of time required to diffusion bond the sheets of material 24 together in the configuration described herein may be, for example, $1/100^{th}$ of the time required by prior art manufacturing methods which diffusion bond titanium honeycomb core inside a vacuum chamber. Specifically, instead of taking in excess of eight hours for diffusion bonding, the method 900 described herein may only require mere seconds or minutes of joule heating to form the desired diffusion bonding. For example, in some embodiments of the invention, applying of electric current is performed for less than thirty minutes, less than 15 minutes, or less than 5 minutes to achieve diffusion bonding of the sheets of material 24 described herein.

In some embodiments of the invention, the step of applying electric current may be performed in ambient air or with the sheets of material 24 substantially surrounded by a cover of a shielding gas, such as a slight, localized blanket of argon gas, helium, carbon dioxide, and/or oxygen. Advantageously, because most of the sheets of material 24 are shielded from ambient air by surrounding adjacent sheets of material 24, and due to the short amount of time required for joule heating, embrittlement of the metal experienced in other prior art methods is not as much of a concern. Thus, a vacuum chamber is not required for diffusion bonding the sheets of material 24 using the novel methods described herein, advantageously saving space, money, and time typically associated with using a vacuum chamber, as noted above. If the joule heating described herein is performed without the shielding gas cover, the resulting honeycomb core 12 may need to be trimmed to remove a small amount (e.g., ¼ inch) of material from each side which was directly exposed to the air.

Due to the staggered configuration of the stop-off material 30, the electricity sent through the thickness of the stack 26 does not flow directly through the stack 26 in a direction of thickness. Specifically, current flows from one diffusion-bonded point (also referred to herein as a node 42) to another diffusion bonded point or node 42. This is illustrated in FIG. 6, which schematically depicts notional electron flow using a series of arrows 44, and also illustrates the direction of movement 46 of the force-inducing components 14 while placing the joule-heating press 10 from an open configuration into a closed configuration compressing the stack 26. Conversely, note that a solid stack of the sheets of material 24 without staggered insulative stop-off material 30 would require vastly more current. Thus, the stop-off material 30 in the present invention must be made of material suitable to serve as both a diffusion bond preventer and an electrical insulator. Note that the stack 26 also provides a small amount of interface resistance between the sheets of material 24 before they have fully bonded to each other, also aiding in the joule-heating thereof.

In some embodiments of the invention, the method 900 may additionally include a step of machining the diffusion bonded sheets of material 24 into a desired configuration, as depicted in block 912. However, this step may be omitted without departing from the scope of the invention. The diffusion bonded sheets of material 24 may be machined into any desired thickness or configuration before and/or after expansion. In some alternative embodiments of the invention, a plurality of honeycomb cores can be cut or machined from one diffusion bonded stack before or after expansion thereof.

Advantageously, when the final form of honeycomb cores is machined and/or cut before expansion thereof, the risk of introducing foreign object damage can be effectively mitigated. Specifically, since the cells 28 are closed during machining or cutting, this protects them from chips and foreign objects entering the cells 28 and/or damaging the inner cell walls 34. Furthermore, since there is no need for bending or metal forming operations the shape will have optimized stability, with little or no spring back when the honeycomb core 12 is bonded to a face sheet and/or a back sheet. Please note that the advantages of machining or cutting the honeycomb core stack 26 prior to expansion thereof may also be applicable to manufacture of adhesively bonded, welded, or brazed aluminum honeycomb cores as well, without departing from the scope of the invention.

The method 900 may further include a step of expanding the stack 26, as depicted in block 914, thus forming the honeycomb core 12. Specifically, the outer-most sheets of material in the stack 26 may be pulled in opposite directions, away from each other, thereby pulling surfaces with the stop-off material 30 thereon away from each other, forming the cells 28 of the honeycomb core 12. For example, the sheets of material 24 may be draped over an expansion mandrel to spread and/or stretched the cells 28 to a desired length and/or width. The honeycomb core 12 may then be lowered into a solution (e.g., water) in order to remove remaining brazing/diffusion top-off paint, if needed.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of manufacturing a honeycomb core, the method comprising the steps of:
    applying a pattern of strips of a stop-off material to surfaces of a plurality of sheets of metal at locations where diffusion bonding is not desired, the step of applying the pattern of strips including the sub-steps of:
        applying a first strip having at least one of a first width, spacing, shape, and size; and
        applying a second strip having at least one of a second width, spacing, shape, and size different than the first width, spacing, shape, or size of the first strip so that the pattern of strips includes at least two different widths, spacings, shapes, or sizes;
    stacking the sheets of metal together in a sequence for forming the honeycomb core;
    pressing the sheets of metal together between two press plates comprising conductive material;
    applying electric current to the conductive material of the press plates, such that current flows through a thickness of the sheets of metal and such that the sheets of metal are diffusion bonded to each other at locations absent the stop-off material; and
    expanding the sheets of metal into the honeycomb core so that the at least two different widths, spacings, shapes, or sizes effects at least one of selective contouring of the honeycomb core and at least two different densities of honeycomb core cells.

2. The method of claim 1, wherein the step of expanding the sheets of metal into the honeycomb core comprises pulling outer-most ones of the sheets of metal in opposite directions away from each other.

3. The method of claim 1, wherein the step of applying electric current is performed in ambient air or with the sheets of metal substantially surrounded by a cover of a shielding gas.

4. The method of claim 1, wherein the applying of electric current is performed for less than thirty minutes.

5. The method of claim 1, wherein the pressure applied via the two press plates pressing the sheets of metal together is between 5,000 and 10,000 PSI.

6. The method of claim 1, wherein the applying step comprises printing a brazing stop-off compound or ceramic stop-off paint onto at least one side of each of the sheets of metal.

7. The method of claim 1, wherein the pattern of spaced apart strips of the stop-off material is alternated or inverted for each successive one of the sheets of metal stacked together.

8. The method of claim 1, further comprising a step of removing material from the diffusion bonded sheets of metal so as to modify the diffusion bonded sheets of metal into a desired configuration prior to the step of expanding the sheets of metal into the honeycomb core.

9. A method of manufacturing a honeycomb core, the method comprising the steps of:
    printing a pattern of spaced apart strips of a stop-off material to surfaces of a plurality of sheets of metal at locations where diffusion bonding is not desired, wherein the printing step includes the sub-steps of:
        printing a first strip having at least one of a first width, spacing, shape, and size; and
        printing a second strip having at least one of a second width, spacing, shape, and size different than the first width, spacing, shape, or size of the first strip so that the pattern of strips includes at least two different widths, spacings, shapes, or sizes;
    stacking the sheets of metal together in a sequence for forming the honeycomb core;
    pressing the sheets of metal together between two press plates comprising conductive material;
    applying electric current to the conductive material of the press plates, such that current flows through a thickness of the sheets of metal and such that the sheets of metal are diffusion bonded to each other at locations absent the stop-off material; and
    expanding the sheets of metal into the honeycomb core after the locations absent the stop-off material are diffusion bonded with adjacent ones of the sheets of metal so that the at least two different widths, spacings, shapes, or sizes effects at least one of selective contouring of the honeycomb core and at least two different densities of honeycomb core cells.

10. The method of claim 9, wherein the step of expanding the sheets of metal into the honeycomb core comprises pulling outer-most ones of the sheets of metal in opposite directions away from each other.

11. The method of claim 9, wherein the step of applying electric current is performed in ambient air or with the sheets of metal substantially surrounded by a cover of a shielding gas.

12. The method of claim 9, wherein the applying of electric current is performed for less than thirty minutes.

13. The method of claim 9, wherein the pressure applied via the two press plates pressing the sheets of metal together is between 5,000 and 10,000 PSI.

14. The method of claim 9, wherein the printing step comprises printing a brazing stop-off compound or ceramic stop-off paint onto at least one side of each of the sheets of metal.

15. The method of claim 9, wherein the pattern of spaced apart strips of the stop-off material is substantially alternated or inverted for successive ones of the sheets of metal stacked together.

16. The method of claim 9, further comprising a step of removing material from the diffusion bonded sheets of metal so as to modify the diffusion bonded sheets of metal into a desired configuration prior to the step of expanding the sheets of metal into the honeycomb core.

* * * * *